United States Patent [19]

Brand et al.

[11] Patent Number: 4,895,344

[45] Date of Patent: Jan. 23, 1990

[54] ELECTRIC CONTROL MOTOR

[75] Inventors: Güenter Brand; Richard Gerber, both of Stuttgart; Gerold Grimm, Leonberg; Harald Kalippke, Benningen; Harald Sailer, Markgroningen, all of Fed. Rep. of Germany

[73] Assignee: Robert Bosch GmbH, Stuttgart, Fed. Rep. of Germany

[21] Appl. No.: 203,800

[22] Filed: Jun. 8, 1988

[30] Foreign Application Priority Data

Aug. 27, 1987 [DE] Fed. Rep. of Germany ....... 3728589

[51] Int. Cl.[4] ............................................ F16K 31/04

[52] U.S. Cl. ........................... 251/129.11; 251/129.12

[58] Field of Search ....................... 251/129.11, 129.12

[56] References Cited

U.S. PATENT DOCUMENTS 4,426,988 1/1984 Greiner et al. .

4,494,517 1/1985 Kratt et al. ................ 251/129.11 X 4,593,222 6/1984 Burkel et al. .

4,742,989 5/1988 Akagi ......................... 251/129.11 X

FOREIGN PATENT DOCUMENTS 196377 11/1983 Japan .............................. 251/129.11

*Primary Examiner*—Arnold Rosenthal

*Attorney, Agent, or Firm*—Edwin E. Greigg

[57] ABSTRACT

In control motors having an armature rotatable counter to a spiral spring, a problem arises that the set force of the spiral spring can be changed by the process of installation. The disclosed control motor is intended to enable setting of the force of the spiral spring after installation. To enable setting of the force of the spiral spring after installation, relative to which an armature of a control motor is rotatable, a shaft on which the armature is supported is screwed with a screw end into a threaded bore of a housing bottom end. Connected to the shaft is an adjusting element, which with a driver arm engages an end portion provided on the outer end of the spiral spring. By rotating the ends of the shaft, which are accessible from outside, the force of the spiral spring can be changed. The invention is preferably applicable to idling adjusters, but it is not limited to this field of application.

5 Claims, 2 Drawing Sheets

ELECTRIC CONTROL MOTOR

BACKGROUND OF THE INVENTION

The invention is directed to an electric control motor. A control motor is already known in which the installation process and closure of the housing undesirably changes a set force of a spiral spring control for an armature which makes removal and resetting necessary.

OBJECT AND SUMMARY OF THE INVENTION

The control motor according to the invention has an advantage over the prior art in that the force of a spiral spring can be set after the control motor is installed, so that changes in the force of the spiral spring caused by installation can be corrected after assembly without great effort.

It is particularly advantageous to provide an adjusting element for setting the force of the spiral spring with a driver arm, which engages the outer end of the spiral spring.

It is also advantageous to secure the adjusting element on a control motor shaft that is screwed into a threaded bore of the housing with a screw end having an outside thread.

Another advantageous provision is for the adjusting element to have a cylinder step, rotatably supported in a sliding bore of a housing cap.

The invention will be better understood and further objects and advantages thereof will become more apparent from the ensuing detailed description of a preferred embodiment taken in conjunction with the drawings.

DESCRIPTION OF THE PREFERRED EMBODIMENTS

Figure 1:
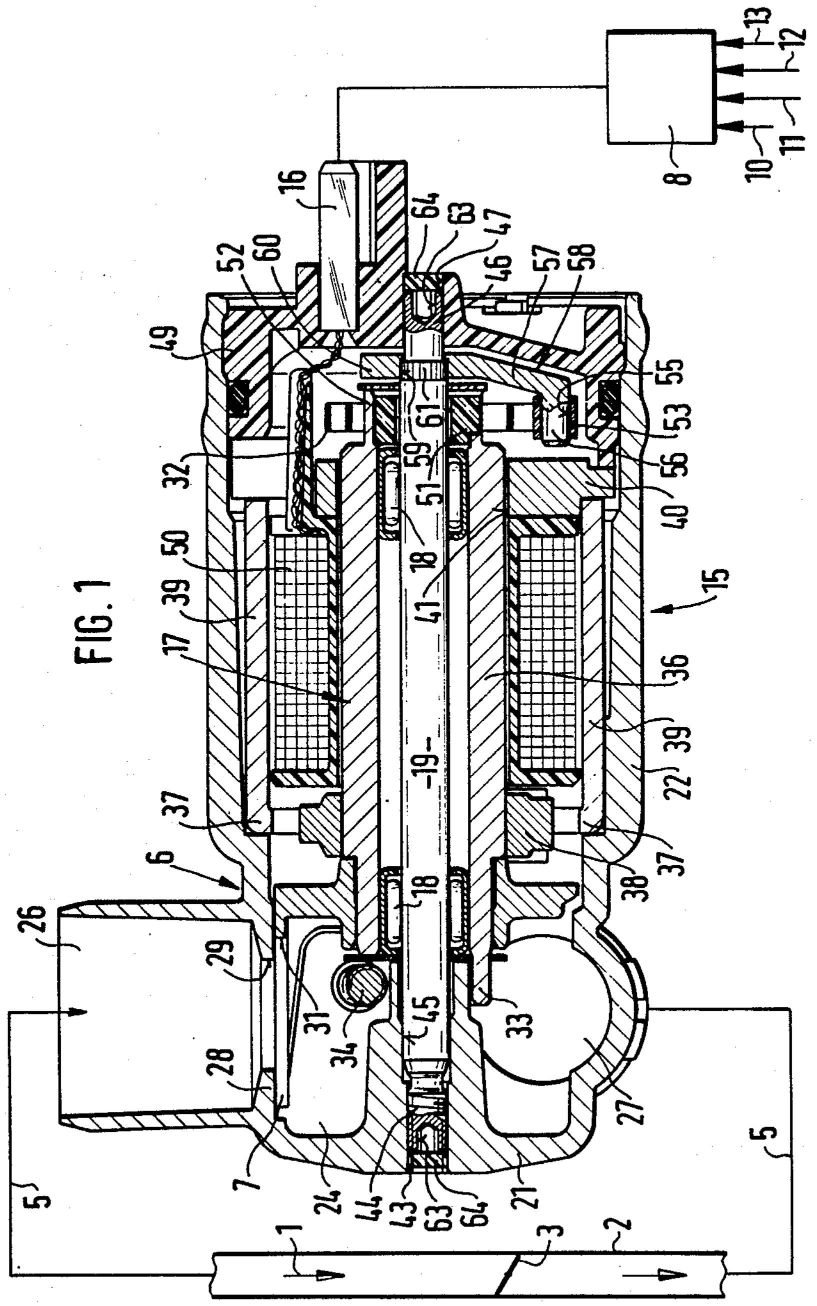
FIG. 1 shows a first exemplary embodiment of a control motor equipped in accordance with the invention.

The electric control motor shown in the drawing is preferably used to control a throttle cross section in a fluid flow line, especially a line carrying idling air for an internal combustion engine during idling. In the exemplary embodiment of FIG. 1, combustion air flows in the direction of the arrow 1 through an intake tube 2 past a throttle valve 3 to an engine, not shown. Communicating with the intake tube 2 is a bypass line 5, which bypasses the throttle valve 3; the cross section of the bypass line 5 can be varied by a so-called idling adjuster 6 by means of a throttle device 7. The idling adjuster 6 is triggered by an electronic control unit 8, which at its input 10 receives the supply voltage furnished by the vehicle battery, at input 11 it receives a signal for the engine rpm, picked up by the ignition distributor of the engine, at input 12 it receives a signal for the engine temperature, and at input 13 it receives a voltage characterizing the position of the throttle valve 3, which is for example obtained by a potentiometer connected to the throttle valve 3. As needed, still other engine operating characteristics can be supplied to the electronic control unit 8.

In the present exemplary embodiment, an electric motor, which is triggerable by the electronic control unit 8 via a plug 16 as a function of input operating characteristics 11–13, serves as the control motor 15 of the idling adjuster 6. In the excited state of the control motor 15, an armature 17 is rotatably supported via roller bearings 18 about a shaft 19 and rotated by the control motor. The shaft 19 is supported in a housing bottom end 21 of a cup-shaped housing 22 of the idling adjuster 6. The throttle device 7, which is embodied in the manner of a tubular segment and protrudes into a swivel chamber 24 formed in the housing bottom end 21 and intersecting the bypass line 5, is connected to the armature 17 in a manner fixed against relative rotation and rotated thereby. An inflow fitting 26 connected with the intake tube 2 upstream of the throttle valve 3 is connected to the swivel chamber 24 on the inlet side, and an outflow fitting 27 connected with the intake tube 2 downstream of the throttle valve 3 is connected to the swivel chamber 24 on the output side. With its circumference, the tubular-segment throttle device 7 protrudes as tightly as possible across the inlet as far as the end wall of the swivel chamber 24. In the wall 28 of the swivel chamber 24 oriented toward the inflow fitting 26, at least one control opening 29 is formed by a recess and which can be opened to a variable extent by the throttle device 7. To this end, the tubular-segment throttle device 7 can for instance have a throttle opening 31 penetrating it, which upon a rotational movement of the throttle device 7 is made to coincide to a variable extent with the control opening 29 and as a result opens the control opening 29 to a variable extent, forming a throttle cross section. The rotation of the throttle device 7 by the control motor 15 is effected counter to the force of a spring element embodied as a spiral spring 32, which is connected at its inner end to the armature 17. In the non-excited state of the control motor 15, the spiral spring 32 rotates the armature 17 and throttle device 7 with a stop section 33 on the armature, against a stop screw 34 screwed into the housing bottom 21. With the stop section 33 resting on the stop screw 34, the throttle device 7 can be retained by the spiral spring 32 in an outset position in which the control opening 29 is not completely closed by the throttle device 7; instead, the throttle opening 31 remains open and coincides partly with the control opening 29, so that in this position an emergency-operation cross section is present, by way of which air or a fuel-air mixture can flow through the bypass line 5 from upstream to downstream of the throttle valve 3 into the intake tube 2. The fuel quantity per unit of time flowing via the emergency-operation cross section is sufficient, should the electrical system fail, to furnish a favorable fuel-air mixture for further operation of the engine, or during engine starting to allow a predetermined favorable quantity to reach the engine.

The armature 17 has a cylindrical pole carrier 36, embodied as a hollow shaft, and wedge-shaped pole pieces 38, each of which is associated with one magnetic pole 37. The pole pieces 38 extend in the radial direction to the magnetic poles 37 and are connected, for instance as an independent part, with the pole carrier 36. In the present exemplary embodiment, two magnetic poles 37 are intended to be disposed facing one another, so that two pole pieces 38 are likewise provided on the armature 17, each pole piece being associated with one of the magnetic poles. Each magnetic pole 37 is embodied on a bar-like magnetically conductive guide body 39, for instance having the cross section of a tubular segment.

With their ends remote from the magnetic poles 37, the guide bodies 39, supported inside the nonmagnetic tubular housing, engage a magnetically conductive short circuit plate 40, which has a central bore 41 through which the pole carrier 36 protrudes and with the central bore forms an auxiliary air gap. A working air gap is formed between each magnetic pole 37 and the pole piece 38.

The housing bottom end 21 has a threaded bore 43, into which a screw end 44, provided with an outer thread, of the shaft 19 is screwed. In the direction of the housing interior, the threaded bore 43 is adjoined by a guide bore 45, which guides the shaft 19 precisely, via a close fit. The opposite end 46 of the shaft 19, remote from the screw end, is rotatably supported in a slide fit bore 47 of a cap 49, which is joined to the housing 22 in such a way, for example by being crimped, that it closes off the housing from the outside.

An electromagnet coil 50 is disposed spaced radially apart from the pole carrier 36, between the pole pieces 38 and the short circuit plate 40. Upon electrical excitation via the plug 16, the coil 50 generates a magnetic field that rotates the armature 17 counter to the force of the spiral spring 32. For this purpose, the inner end of the spiral spring 32 engages a bushing 51, which is connected in a manner fixed against relative rotation to an end 52 of the pole carrier 36 oriented toward the cap 49. In the instance shown, the connection between the bushing 51 and the end 52 can be accomplished by some sort of toothing. The outer end of the spiral spring 32 is connected to an end part 53, which has a through bore 55 into which an angle end 56 of a driver arm 57 is fittingly introduced, in such a way that the angle end 56 has no play in the bore. The driver arm 57 is part of an adjusting element 58, which with a hub 60, having a retaining bore 59, encompasses the shaft 19 in a manner fixed against relative rotation in a region between the cap 49 and the end 52 of the pole carrier 36 in which the armature 19 is provided with a knurled portion 61. Naturally, the adjusting element 58 can be fastened to the shaft 19 arbitrarily, for example by means of a screw connection or a tongue-and-groove arrangement. Rotation of the shaft 19 necessarily rotates the adjusting element 58 as well, causing the outer end of the spiral spring 32 to rotate relative to the armature 17, and hence changing the force of the spiral spring upon the armature 17. For rotating the shaft 19, the opposite end 46 and/or the screw end 44 may for example be provided with a hexagonal socket 63, which is engaged with an Allen wrench. Once the force of the spiral spring 32 has been set, the threaded bore 43 on the screw end 44 and the slide fit bore 47 on the opposite end 46 are filled with a suitable filling compound 64, for the sake of sealing and to fix the position of the shaft 19.

Figure 2:
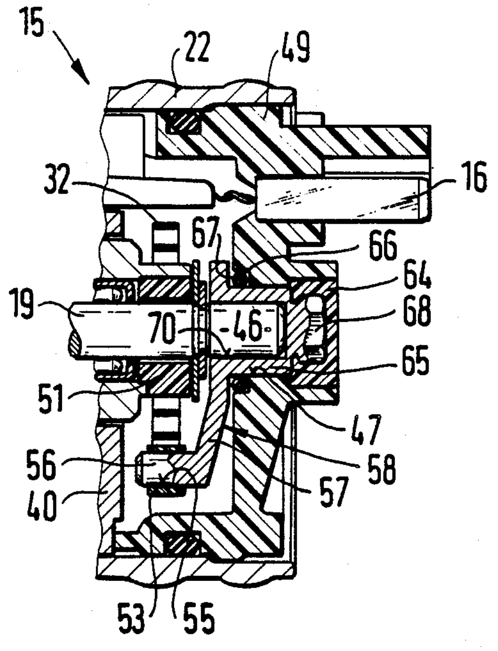
FIG. 2 is a fragmentary view of a second exemplary embodiment of a control motor, equipped in accordance with the invention.

In the second exemplary embodiment of FIG. 2, elements remaining and functioning the same as those in the first exemplary embodiment are identified by the same reference numerals. The structure of the idling adjuster 6, not shown in further detail here, is equivalent to that shown in FIG. 1 except that there is no threaded bore 43 in the housing bottom end 21, and there is no screw end 44 of the shaft 19, since in the embodiment of FIG. 2 the support of the shaft 19 is effected by a press fit in the guide bore 45. In the exemplary embodiment of FIG. 2, the adjusting element 58 has a cylinder step 65, which with its outer circumference is rotatably supported in the slide fit bore 47 of the cap 49, which extends coaxially with the shaft 19 and has a diameter larger than that of the shaft. In a groove 66 of the cap 49 surrounding the slide fit bore 47, there is a sealing ring 67, which on the other side rests on the cylinder step 65 and not only seals it off from the outside but also protects it against twisting. For rotation of the adjusting element 58 in this embodiment, an external hexagon 68 can be provided on the end of the cylinder step 65 remote from the shaft 19; once the spiral spring 32 has been set, this hexagon is potted with the filling compound 64 inside the slide fit bore 47. The cylinder step 65 has a bearing bore 70, in which the opposite end 46 of the shaft 19 is guided.

The exemplary embodiments of the invention shown in FIGS. 1 and 2 make it possible to set the force of the spiral spring 32, after installation of the idling adjuster 6 is complete, in such a way that this setting is not changed by installation work afterward.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An electric control motor, in particular for controlling a throttle cross section in a line carrying a fluid to an internal combustion engine, having an armature (17) rotatable in a housing (22), a spiral spring (32) connected by an inner end to said armature which rotates said armature in said housing counter to the force of said spiral spring, said spiral spring including an outer end (53) which is secured on an adjusting element (58), said adjusting element is located such that it is variable independently of a rest position of said armature (17), in order to set a force of the spiral spring (32) on said armature, said adjusting element (58) is rotatably supported coaxially with said armature (17) and includes a driver arm (57) which engages said outer end (53) of said spiral spring (32), said housing (22) includes a threaded bore (43) into which an outer screw end (44) of an armature shaft (19) is threaded, and said adjusting element (58) is firmly connected to said shaft about which said armature (17) is rotatably supported.

2. A control motor as defined by claim 1, which includes means for fixing said shaft (19) in said housing (22) after a rotation thereof for setting a force of the spiral spring (32) for rotation of said armature.

3. An electric control motor, in particular for controlling a throttle cross section in a line carrying a fluid to an internal combustion engine, having an armature (17) rotatable in a housing (22), a spiral spring (32) connected by an inner end to said armature which rotates said armature in said housing counter to the force of said spiral spring, said spiral spring including an outer end (53) which is secured on an adjusting element (58), said adjusting element is located such that it is variable independently of a rest position of said armature (17), in order to set a force of the spiral spring (32) on said armature, said adjusting element (58) is rotatably supported coaxially with said armature (17) and includes a driver arm (57), which engages said outer end (53) of said spiral spring (32), said adjusting element (58) includes a cylinder step (65) which protrudes into a slide fit bore (47) of a cap (49) of the housing (22) and is rotatably supported therein.

4. A control motor as defined by claim 3, in which said adjusting element (58) is fixable in said housing (22) after a rotation thereof for setting a force of said spiral spring (32) on said armature.

5. A control motor as defined by claim 3, in which said armature (17) is rotatably supported on said shaft (19), and an end (46) of said shaft (19) protrudes into a bearing bore (70) in said cylinder step (65) of the adjusting element (58).

* * * * *